APPARATUS FOR STORING A PLURALITY OF ELONGATED PANELS

Filed Oct. 21, 1965

INVENTORS.
Gerard O. Walter
Freeland R. Goldammer
BY Attilio A. Demeo
Frank A. Seemar
AGENT.

United States Patent Office 3,407,938
Patented Oct. 29, 1968

3,407,938
APPARATUS FOR STORING A PLURALITY OF ELONGATED PANELS

Gerard O. Walter, Westbury, Freeland R. Goldammer, Williamsville, and Attilio A. De Meo, Brooklyn, N.Y., assignors to Sperry Rand Corporation, New York, N.Y., a corporation of Delaware Filed Oct. 21, 1965, Ser. No. 499,539
5 Claims. (Cl. 211—41)

The present invention relates in general to a container and more particularly to a storage container arrangement adapted to accommodate a plurality of elongated panels for holding segments of microfilm or the like.

Generally, the overall size of information retrieval apparatus having storage capabilities is in direct proportion to the size of the container for storing the information carrying media. Thus, in most apparatus for storing and retrieving documented information the amount of information stored dictates the required storage area, or conversely, the storage capacity, which is a salient feature of any such apparatus, is limited in accordance with the space available. In presently known apparatus of this nature it is common to condense the information media, and thus enhance the storage capacity, by employing conventional microfilming techniques to minify documented information and then store the information carrying media in a manner which facilitates selective retrieval at such time as viewing of the filmed information is desired. Although the storage area required in microfilm system is greatly reduced when compared to that which would be required by systems for handling original documents carrying the same information, many problems have been encountered in attempts to provide compact microfilm storage containers. These problems are due mainly to the requirement of accuracy inherent in any apparatus (whether manual or automatic) for handling miniature elements. It should be noted that the general concept of the present invention lends itself to microfilm systems and for exemplary purposes it is described in an environment suitable therefor; however, the unique aspects set forth may be adapted in any similar storage container arrangement.

In the microfilm storage and retrieval art there are many different methods (manual and automatic) for handling the information carrying media, which generally comprises a plurality of document replicas, and these methods are necessarily dependent upon the type, size, and holding means for such document replicas. Usually the document replicas are presented on film strips wound on reels or divided into segments of one or more frames. To enhance the handling of document replicas presented on segments of film having a particular number of frames, there are many types of holders in the shape of elongated panels adapted to accommodate one or more segments in an end to end fashion. Although such holders are preferable to protect the film against marring and to provide rigidity thereto for purposes of manipulation, the film segments themselves, if desired may be manipulated without the benefit of such holders. Therefore, another problem prevalent in the art is the necessity to provide compact storage apparatus for microfilm strips presented in a rigid manipulatable manner whereby surface marring is obviated.

It is, therefore, an object of this invention to provide an improved storage container.

Another object is to provide an improved storage container for a plurality of elongated panels wherein the novel structure is simple and economical to assemble.

A further object is to provide an improved, compact storage container wherein a plurality of separate storage compartments are accurately spaced in a rigid structure whereby elongated panels are readily placed therein and retrieved therefrom by a carrier mechanism which may be manually or automatically manipulated.

Still another object is to provide a novel storage container for a plurality of elongated panels wherein the container is adapted to cooperate with the panels when inserted therein to releasably retain same in the container.

A still further object is to provide storage apparatus including a novel arrangement of elongated panels adapted to be releasably retained in a storage container having a plurality of accurately disposed panel receiving compartments, wherein the panels when disposed therein are readily accessible from more than one side of the compartment.

The present invention is directed to a container having a substantially rectangular outer shell configuration, which container is adapted for storing a plurality of elongated panels in separate adjacent bins. The container comprises a rigid compact unit which lends itself to simple, economical construction, by virtue of its unique structure which includes an outer shell having partitions disposed therewithin for defining side by side bays, which bays may be further divided into individual cells by means adapted for accurately maintaining the partitions spacing. Each cell accommodates several panels in bins arranged in a predetermined compact fashion. In a preferred embodiment the invention contemplates storage apparatus in which the mentioned partitions include accurately dimensioned corrugated sheets whereby the grooves and ridges thereof provide the individual bins. The partitions are disposed such that ridges are positioned in facing relationship in each bay to form opposing tracks to slideably receive the panels, which panels are adapted to cooperate with a novel holding arrangement associated with the container. The novel holding means functions to retain the panels in storage unless and until selective retrieval of one panel is desired, at which time such panel is released from its respective bin and carried manually or automatically to a desired work station. A further feature of the holding means is its adaptability to release the panels and permit accessability to the storage bins from an area other than the working side of the bins, which feature facilitates rapid replacement or preloading of the panels.

The foregoing and other objects, features and advantages of the invention will appear more fully hereinafter from a consideration of the detailed description which follows, in conjunction with the accompanying sheet of drawing wherein one principal embodiment of the invention is illustrated by way of example. It is to be expressly understood, however, that the drawing is for illustrative purposes only and is not to be construed as defining the limits of the invention.

In the drawing wherein like reference characters refer to like parts throughout the several views.

Figures 1, 2, 3, 4, 5, 6, 7:
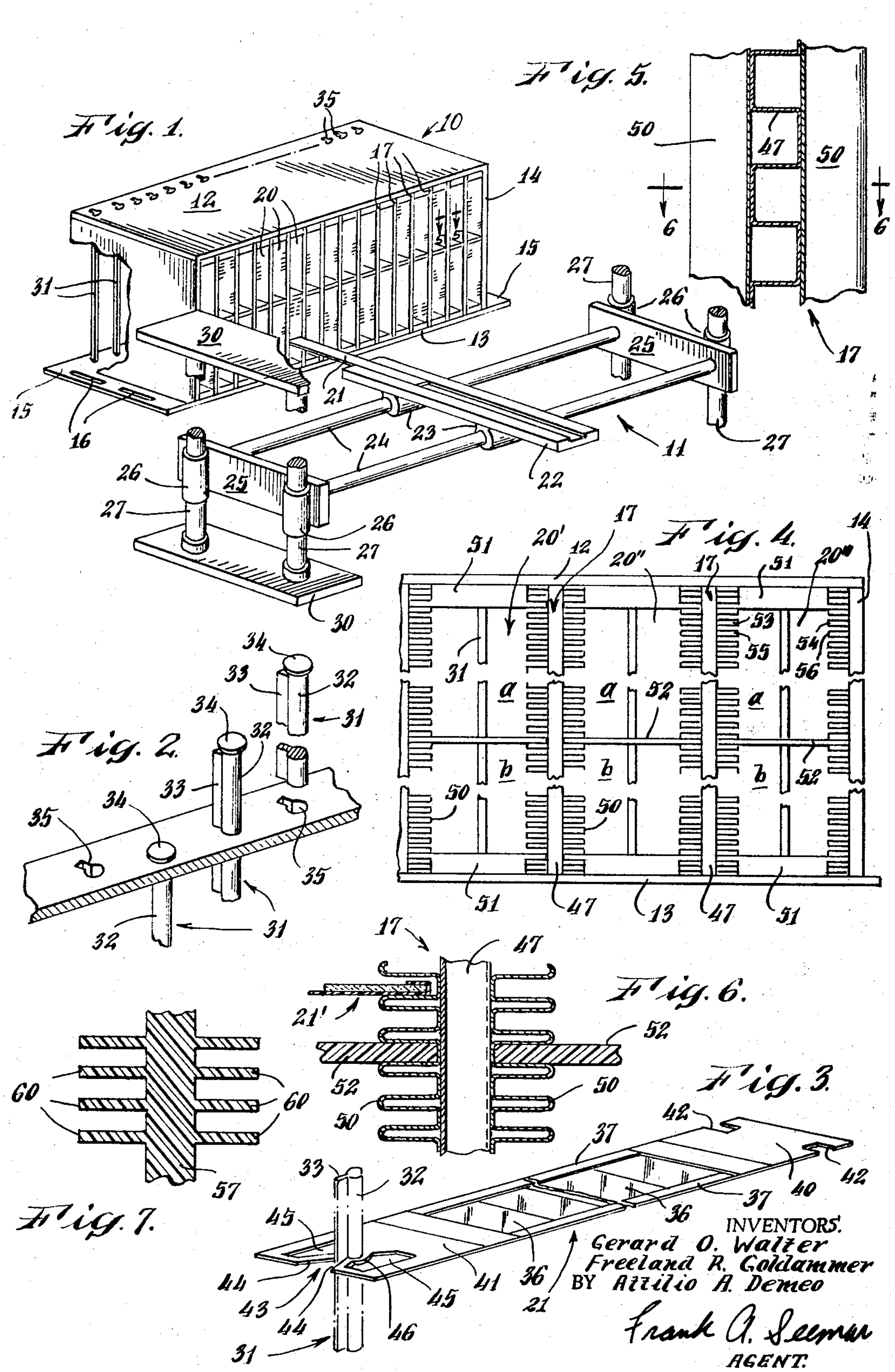
FIG. 1 is a perspective view of an arrangement showing novel storage apparatus and associated panel transport means illustrative of the type ancillary equipment which may be employed with the present invention.
FIG. 2 is a detailed view of the holding means for retaining elongated panels in the subject storage container.
FIG. 3 is a perspective view of an elongated panel adapted for storage in subject storage container.
FIG. 4 is a partial elevational view of the storage container shown in FIG. 1.
FIG. 5 is a sectional view taken along line 5—5 of FIG. 1.
FIG. 6 is a sectional view taken along line 6—6 of FIG. 5.
FIG. 7 is a detail view of a portion of a modified embodiment of subject storage container.

Referring to the drawing for a detailed description of the present invention, and more particularly to FIG. 1, wherein a perspective view of the novel storage arrangement is shown, the reference numeral 10 generally designates a storage container disposed adjacent transport means 11, which is shown in diagrammatic form to illustrate typical ancillary equipment capable of being employed during automatic operation. It should be noted that, although the present invention is directed to structure that facilitates automatic operation, it is not inended hat the concept of manual manipulation be ignored, which will be evident from the following detailed description. Container 10, being substantially rectangular in configuration, has an outer frame including a top plate member 12, a base plate member 13, and two opposing side plate members 14 extending in a parallel manner between the edge portions of the top and base plate members to form a rectangular shell. The base plate member 13 includes flange portions 15 extending beyond side plate members 14 to provide an area for slots 16 by which manual transport of the storage container is facilitated. The slots are of the proper size and configuration to accommodate the fingers of a user wishing to lift the container by grasping the flange portions 15. The container further includes a plurality of vertical partitions 17 (described in detail hereinbelow) extending between the base and top plate members in parallel and spaced relationship with each other and with the side plates, to define a plurality of side by side bays 20. Each bay is adapted to accommodate a plurality of panels 21, one of which is shown in schematic form in FIG. 1 in relation to container 10 and transport means 11.

Transport means 11 is not a part of the present invention but is shown to illustrate diagrammatically a typical device for accurately positioning a carrier channel 22 adjacent any selected bin in the storage container 10. The carrier 22, which is mounted for bidirectional transverse motion, includes integral collar portions 23 extending from the bottom thereof and axially aligned for sliding engagement with horizontal rods 24. The horizontal rods 24 are in turn attached to horizontal bars 25, which are secured to collars 26 disposed in sliding engagement with vertical rods 27. Mounting plates 30 serve as anchoring means for the vertical rods 27 and as such they serve as stationary mounting means for entire transport assembly which provides horizontal and vertical motion for the carrier 22 with respect to the access area of container 10. The remaining elements of transport means 11, which are also of a conventional nature and not essential to the present invention, include drive means (not shown) for driving the horizontal bars 25 and collars 26 in a vertical direction and drive means (also not shown) for driving the carrier 22 and collar portions 23 in a horizontal direction, to effectively position the carrier 22 adjacent any selected bin. Such drive means consist of appropriate mechanical linkage means in combination with a prime mover such as a motor or the like. The carrier itself further necessarily includes means (not shown) for removing and replacing any selected panel 21 from the container 10 when the carrier is positioned adjacent a selected bin by transport means 11.

The cutaway portion of the left side plate member 14 (FIG. 1) shows the disposition of rods 31 with respect to storage container 10, i.e., a rod extends between the top and bottom plate members at a central location at the rear of each bay.

Referring now to FIGS. 2 and 3, rods 31 and one panel 21 are respectively shown in detail. The relationship between the rods and panels, provided by the structure thereof, is an important feature of subject storage container arrangement. The rods 31 each comprises a main body portion 32, a longitudinal strengthening fin 33, if desired, and a top cap 34 having a diameter which exceeds the diameter of the main body portion, thereby providing a symmetrical flanged portion extending as shown. The rods are normally each positioned in opposing slots 35 (disposed in the top and bottom plate members 12 and 13 of container 10) with the cap 34 retaining same in the position illustrated by the left most rod in FIG. 2; however, if desired the rods may be removed to permit rear access to the bins 20. To this end, the rods 31 slideably register with slots 35, as illustrated by the other two rods shown in FIG. 2.

In FIG. 3 a portion of one rod 31 is shown in phantom to illustrate the interaction between the panels and rods of subject arrangement. The panel 21 shown in FIG. 3 is typical of elongated holding devices employed in the information storage art, wherein film segments 36 are retained in a channel shaped device between opposing flange portions 37. The holding device shown, referred to as panel 21, includes a first end tab 40 adapted for cooperating with engaging means (not shown) on carrier 22 for providing longitudinal transport thereof, and a second end tab 41 for releasably engaging rod 31 in the following manner. The length of panel 21 is such that when it is nested in its respective bin, end tab 40 protrudes from the front of storage container 10 a distance sufficient to enable the mentioned engaging means to engage notches 42 for removal of the panel from its storage bin. In replacement of panel 21 to its nested position, end tab 41 is urged against rod 31 whereby registration therebetween is effected and the slotted portion of tab 41 releasably engages rod 31 in the manner shown in phantom at FIG. 3 of the drawing. It should be noted that the rods are disposed with strengthening fins 33 extending rearwardly and by virtue of the configuration of slots 35 (see FIG. 2) snug registration between a tab slot 43 and rod 31 is assured. More specifically, the tab slot is defined by strip portions 44 of tab 41, which strip portions are rendered resilient by virtue of the characteristics of the plastic material from which they are formed and cutaway sections 45 adjacent thereto. The strip portions 44 include shoulders 46 disposed in a manner to permit retention of the panel in its nested position and requiring a slight manimum force along the longitudinal axis of the panel and in a direction away from the rod when removal of the panel from the storage container is desired.

A partial front elevation of storage container 10 is shown in FIG. 4 whereby the novel arrangement of frame, partitions, support means and holding rods are shown in detail. The partition structure is shown in further detail in the partial sectional views of FIGS. 5 and 6. Now referring to FIG. 4, bays 20′ and 20″ are generally defined by top plate member 12, base plate member 13 and the vertically disposed partitions extending therebetween, and bay 20‴ is defined by top plate member 12, base plate member 13, side plate member 14 and the adjacent vertically disposed partition. The partitions each comprises a core member 47 and track forming members 50 secured thereto in any well known manner. As shown in FIGS. 5 and 6 the partitions 17 include core 47 comprising a corrugated sheet with grooves disposed vertically, and two track forming members 50, each comprising corrugated sheets in contiguous relationship to the core 47 and with corrugations orthogonally transverse thereto. The corrugations shown in FIG. 6 are for illustrative purposes only and it should be understood that the relative vertical distance between the ridges as compared to the ridge thickness can be greatly reduced to enhance the storing capacity of subject container. The partitions are spaced and reinforced by end panels 51 which are T-shaped in cross section (as shown in FIG. 4) and extend from the front to the rear of storage container 10. The panels may be fixedly or slideably disposed in the bays with flanged portions snugly engaging opposing grooves of corrugated sheets 50 and outer planar surfaces engaging the inner surface of the bottom and top plate members as shown. The dimensions of end panels 51 are selected such that the engaging surfaces on the flanged portions and their outer planar surfaces bear against the partitions and plate members respectively to effectively provide support and rigidity to the container arrangement.

Each bay is divided into two separate cells *a* and *b* by spacer panels 52 disposed longitudinally in substantially centrally located grooves of opposing corrugated sheets 50. The spacer panels fit in the grooves in a snug fashion (see FIG. 6) to provide further support between the partitions and to assure the retention of their rigid disposition. Depending upon the size of the bays and working requirements of the container, the bays may be divided into any desired number of cells by insertion of spacer panels in selected grooves.

Finally, each cell is divided into a plurality of bins adapted to receive panels of the nature shown in FIG. 3 or the like. Each bin is defined by the tracks formed by opposing corrugations, e.g., tracks for the top bin in cell *a* of bay 20''' consists of the top surface of corrugations 53 and 54, tracks for the next adjacent bin in the same cell consist of the top surface of corrugations 55 and 56, and likewise the bins throughout the container are defined by facing corrugation surfaces. The panels slide loosely in the bins (see partial panel 21' in FIG. 6) and are retained therein by the rod and groove arrangement described above. The relative disposition of the rods 31 with respect to bays 20 is shown in FIG. 4; thus, when one or more panels are nested in appropriate preselected bins they are resiliently retained therein by rods 31, upon being urged to the rearmost extreme of their respective bins.

An alternative embodiment of the partition structure is shown in FIG. 7 wherein a core portion 57 and integral tracks 60 are extruded from plastic to form a similar structure having ridges and grooves disposed in a manner to perform the same function as the corrugations of the preferred embodiment.

In operation, subject container is capable of efficiently accommodating a plurality of similar elongated elements, limited only by the space available and the element size. Referring to FIG. 1, one container 10 is shown for illustrative purposes; however, a plurality of like containers may be arranged in stacked side by side relationship to receive panels in the same manner as the single container described above. The arrangement is especially adapted to accommodate relatively thin elongated panels of the nature shown in FIG. 3, wherein each panel provides rigid mounting means for one or more segments of microfilm. This particular type of information media is merely exemplary and obviously not a limiting factor as to the scope of subject novel storage arrangement.

With more specific reference to the mode of operation, regardless of whether an operator employs an automatic transport of the nature illustrated, or whether he manually manipulates the elongated objects to be stored and retrieved, it is necessary to provide means for identifying such objects with an associated address. To this end each storage bin may have a logical identifying code which may in turn be assigned to a particular panel to thus assure repeated retrieval and storage thereof. For example, the associated address of each particular bin may be designated by a code including a specific digit referring to container, bay, cell and bin locations. More specifically, the container may be identified by upper case letters, the bins may be numbered from left to right, and the cells and bins may be numbered from top to bottom. Thus, the uppermost bin in the left bay of a particular container would then be designated "A–01–01–01," and by assigning the same code to a particular panel the address thereof is established. Likewise the bin immediately below "A–01–01–01" would be designated "A–01–01–02" and associated with a particular panel in a like manner. The remaining bins could be similarly identified and associated with panels as the need arises. During a normal insertion step a panel address is first determined and the panel is then transported to a position adjacent the front of the associated bin at which time the panel is then urged toward the rear of the container along the appropriate tracks. When the tab 41 (see FIG. 3) reaches rod 31, the rod registers with slot

43 and seats between strip portions 44 to retain the panel in the bin. A reverse procedure is employed for panel removal.

It should be noted that when automatic transport means are employed the work area in front of the bins is not readily accessible and in many instances it may even be completely enclosed. Therefore, preloading of the container or later access for removal of panels becomes difficult and even impossible in some instances due to the disposition of the bulky transport assembly. To obviate this problem, the present arrangement features the rods 31 which may be removed from their operative position. This is accomplished merely by sliding the rods upwardly as illustrated in FIG. 2, whereby the panels nested in the bins of the bay associated with the removed rod rest loosely on the tracks. The panel or panels may then be removed by sliding them rearwardly from the container without disturbing the remaining panels of the bay. The rod may then be rethreaded through the slots of the undisturbed (and/or newly inserted panels) to its position with cap 34 resting on the outer surface of the upper plate member.

Many advantages of the present invention have in certain instances been specifically pointed out in the above description or in other instances are obvious from the above description. Included among such advantages are, the simple and economical structure of subject container, and the adaptability of such structure to provide accurate and compact means to store a plurality of panels with a wide variation in size and shape without departing from the featured rigid structure of subject invention. The accuracy brought about by such structural rigidity complements and facilitates both the automatic and manual methods set forth above of transporting the panels.

Further, the unique storage structure permits ready access from both sides while still providing means for retaining the stored panels in their respective bins in a firm preselected nested position capable of removal upon exertion of a slight predetermined longitudinal force thereon.

Although a specific embodiment of the invention has been illustrated and described in detail by way of example, it is to be understood that the invention is not limited thereto. Various changes may be made in the design and arrangement of parts without departing from the spirit and scope of the invention as defined by the appended claims as will now be understood by those skilled in the art.

What is claimed is:

1. Storage apparatus comprising in combination:

(a) a plurality of elongated panels having at one end thereof means for releasably receiving a holding element; and (b) a container, having a frame including a top plate member, a base plate member, and two opposing side plate members extending between the edge portions of the top and base plate members;

(c) said container also having at least one vertical partition extending between said top plate and base plate members to provide side by side bays having side walls defined by said side plate members and said partitions, and opposing horizontal tracks associated with said side walls and adapted to support said elongated panels;

(d) said container further having holding means adjacent one end of said bays including at least one holding element adapted to be releasably received by one or more of said elongated panels when said panels are supported by said tracks;

(e) said means for releasably receiving a holding element comprising a beveled slot defined by integral resilient edge portions;

(f) said holding element comprising a rod attached to said frame for registration with said slots, when said panels are urged against said rod, for releasable engagement therewith.

2. Storage apparatus comprising in combination:

(a) a plurality of elongated panels having at one end thereof means for releasably receiving a holding element;

(b) each of said means comprising an integral end tab portion having a centrally disposed longitudinal slot defined by resilient strip portions disposed in opposition with respect to the longitudinal axis of the panel and providing a beveled inlet to said slot and also centrally disposed adjacent the end edge of said tab;

(c) a storage container including a plurality of rectangular side by side bays, each of which bays is provided with a plurality of bins defined by opposing grooves for supportably receiving an elongated panel;

(d) retaining means comprising a plurality of parallel rods, each one of which is disposed adjacent the end of an associated bay for registration with said slot inlets under conditions where said panels are supported in said bins, said rods having a configuration substantially identical to said slots to facilitate registration between said slots and rods and enable said rods to be seated in said slots for retention thereby when said panel end tabs are urged against said rods to permit entry of said rods through said inlet.

3. Storage apparatus as set forth in claim 1 wherein said top and base plate members are provided with a plurality of opposing apertures having cross-sections substantially identical to said rod cross-sections, through which apertures said rods are disposed in said bays by threading said rods therethrough, whereby said storage bays are adapted for accessibility from both ends of said container.

4. Storage apparatus as set forth in claim 2 wherein said parallel rods are frictionally mounted in opposing apertures in said storage container, whereby said rods may be urgedly removed to permit said bays to be accessible from both ends of said container.

5. Storage apparatus comprising in combination:

(a) a plurality of elongated panels having at one end thereof means for releasably receiving a holding element; and (b) a container, having a frame including a top plate member, a base plate member, and two opposing side plate members extending between the edge portions of the top and base plate members;

(c) said container also having at least one vertical partition extending between said top plate and base plate members to provide side by side bays having side walls defined by said side plate members and said partitions, and opposing horizontal tracks associated with said side walls and adapted to support said elongated panels;

(d) said container further having holding means adjacent one end of said bays including at least one holding element adapted to be releasably received by one or more of said elongated panels when said panels are supported by said tracks;

(e) said plurality of elongated panels each include a common length dimension substantially equal to the depth of said container frame;

(f) said means for releasably receiving a holding element comprising a centrally located beveled slot defined by integral resilient edge portions;

(g) said holding element comprising an affixed rod extending vertically through one end of an associated bay, whereby said rod registers with said slots under conditions where said panels are inserted through the other end of said bay between a pair of opposing grooves and urged against said rod for releasable engagement therewith.

References Cited

UNITED STATES PATENTS

| | | | |
|---|---|---|---|
| 45,648 | 12/1864 | Smith | 211—41 |
| 570,338 | 10/1896 | Reed | 211—41 |
| 1,239,321 | 9/1917 | Webb | 40—65 |
| 1,490,422 | 4/1924 | Frank | 312—10 |
| 2,492,807 | 12/1949 | Marcus | 312—20 |
| 2,983,387 | 5/1961 | Klein | 211—40 |
| 2,989,189 | 6/1961 | Leone | 211—41 |
| 3,203,123 | 8/1965 | Dominy | 206—73 X |
| 3,271,626 | 9/1966 | Howrilka | 211—41 X |

FOREIGN PATENTS

| | | |
|---|---|---|
| 676,346 | 12/1963 | Canada. |
| 381,088 | 10/1964 | Switzerland. |

ROY D. FRAZIER, *Primary Examiner.*

ABRAHAM FRANKEL, *Assistant Examiner.*